May 3, 1949.  L. F. THIRY  2,468,901

CUSHIONING AND VIBRATION DAMPING SUPPORT

Filed Oct. 20, 1945

INVENTOR.
Leon F. Thiry
BY
Evans + McCoy
ATTORNEYS

Patented May 3, 1949

2,468,901

UNITED STATES PATENT OFFICE 2,468,901

CUSHIONING AND VIBRATION DAMPING SUPPORT

Leon F. Thiry, Montclair, N. J., assignor to The General Tire & Rubber Company, Akron, Ohio, a corporation of Ohio Application October 20, 1945, Serial No. 623,499

8 Claims. (Cl. 248—10)

This invention relates to supports for instruments, machines, or the like in which elastic rubber is employed as a cushioning means for absorbing shocks and damping vibrations.

In my copending application Serial No. 597,334, filed June 2, 1945, now Patent No. 2,462,011, I have disclosed a support in which the cushioning element is in the form of a rubber ring having circumferentially spaced enlargements that provide elastic supporting cushions.

The present invention has for its object to provide supports of the character referred to with means for damping harmonic vibrations in the cushioning unit so as to prevent the building up of oscillations of objectionable magnitude.

With the above and other objects in view, the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
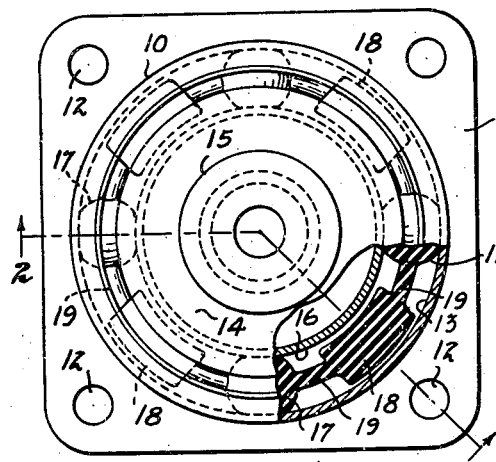
Figure 1 is a top plan view of the support embodying the invention, a portion being broken away to show a segment of the cushioning unit in horizontal section.
Figure 2:
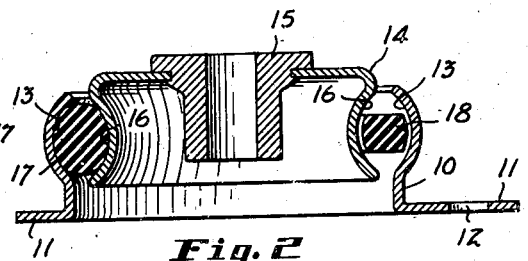
Fig. 2 is a section taken on the broken line indicated at 2—2 in Fig. 1.
Figure 4:
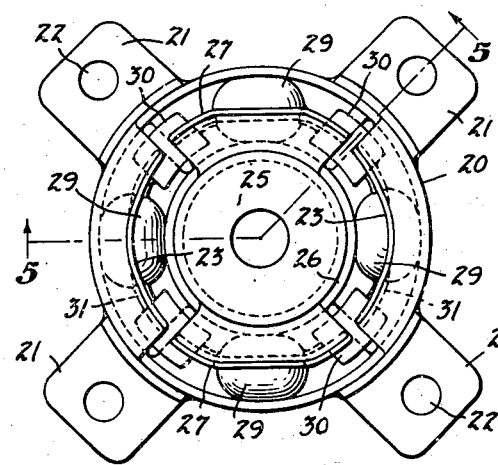
Fig. 4 is a top plan view of a support of modified construction.
Figure 3:
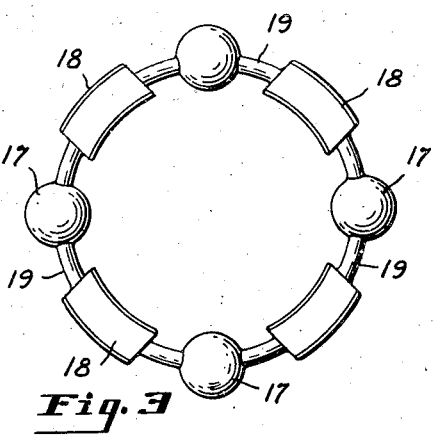
Fig. 3 is a plan view of the cushioning ring.
Figure 5:
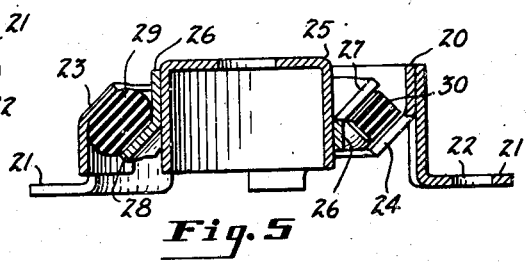
Fig. 5 is a section taken on the broken line indicated at 5—5 in Fig. 4.
Figure 6:
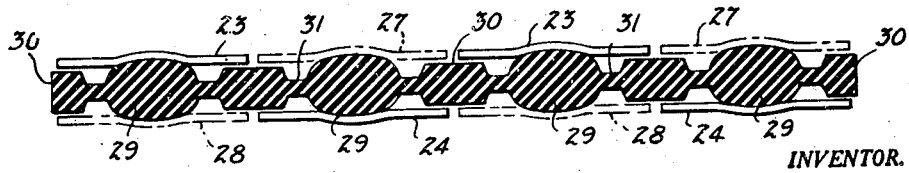
Fig. 6 is a view showing the linear development of a circumferential vertical section through the cushioning ring and relatively movable members of the support.

In Figs. 1, 2 and 3 of the drawings a support is shown which has an outer tubular member 10 that is provided with a base flange 11 having bolt holes 12 by means of which the member 10 may be attached to a stationary support. The tubular member 10 has a transversely concave interior face 13 within which is mounted an inner member 14 of cup shape which may have a central attaching member 15 to receive a portion of the instrument or machine carried by the support. The inner member 14 has a transversely concave exterior seating face 16 that is positioned within the concave face 13 of the outer member 10. The inner member 14 is supported upon a series of circumferentially spaced rubber blocks 17 that are under compression between the concave faces 13 and 16 of the outer and inner members. The faces 13 and 16 provide an annular block receiving space that is restricted at the top and bottom, the two concave faces providing opposed inclined portions between which the blocks 17 are compressed upon movement of the inner member 14 either upwardly or downwardly with respect to the outer member.

The blocks 17 are spaced circumferentially and intermediate the blocks 17 bumper blocks 18 of less thickness than the blocks 17 are provided, the blocks 18 being flexibly connected to the blocks 17 and being of a size such that they are normally out of contact with the faces 13 and 16. As shown in Fig. 3 the blocks 17 and 18 are parts of an integral rubber ring, the blocks 17 and 18 being regularly spaced throughout the periphery of the ring and being connected by integral webs 19 of relatively small cross section.

The size of the bumper blocks 18 is such that these blocks are normally supported with a slight space between their inner and outer surfaces and the faces 13 and 16 of the supporting members. Upon abnormal movement of the member 14 with respect to the member 10, the blocks 18 are engaged by the faces 13 and 16 and offer added resistance to relative movements of the supporting members. The purpose of the blocks 18 is to prevent the building up of oscillations of large magnitude due to harmonic vibrations. For example, if the vibrations imposed upon the support should be at the natural frequency of vibrations of the support, the vibrations become harmonic and tend to increase in amplitude. The bumpers 18, however, serve to effectually break up or dampen such harmonic oscillations and prevent excessive relative movements of the yieldably connected supporting members.

In Figs. 4 to 7 of the drawings another form of support is shown which comprises an outer tubular member 20 having a base flange 21 and bolt holes 22 for attachment to a suitable support. The member 20 has upwardly extending inwardly inclined tongues 23 projecting from its upper edge at circumferentially spaced points and correspondingly integral tongues 24 which are intermediate the tongues 23 and which extend downwardly from the lower portion of the member 20. An inner cup shaped member 25 is mounted within the outer member 20, the cup shaped member 25 having an exterior sleeve 26 attached thereto that is provided with upper and lower tongues or flanges 27 and 28 that overlie and underlie the tongues 24 and 23 carried by the outer member 20. The inner member 25 is yieldably supported upon the outer member 20 by means of a cushioning unit that comprises circumferentially spaced cushioning blocks 29 and bumper blocks 30 interposed between the blocks 29, the blocks 29 and 30 being connected together in a ring by means of webs 31 of relatively small cross section.

The weight imposed upon the inner supporting member 25 is yieldably supported by the cushioning blocks 29 and the extent of relative movement between the members 25 and 26 is limited by means of the bumper blocks 30 which are of a thickness slightly less than the space between the opposed seating flanges or tongues of the supporting members, so that the initial movement of the inner member 25 is not affected by the blocks 30 but excessive movements are prevented by engagement of the tongues 23 and 28 and 24 and 27 with the bumper blocks 30.

The seats of the two connected members are disposed in offset circumferential rows with certain of the circumferentially spaced seats of each member facing oppositely so that certain of the cushioning blocks between opposed seats are effective to resist thrusts in one direction while other of the blocks resist thrusts in the opposite direction.

The downwardly facing tongues 23 of the outer member 20 alternate with the upwardly facing tongues 24 to cooperate with the tongues 27 and 28 of the inner member 25 to provide opposed seats between which the cushioning blocks 29 are held. An even number of cushioning blocks 29 are preferably employed, alternate equally spaced blocks cushioning axial thrusts in one direction and the intermediate blocks cushioning the axial thrusts in the opposite direction. The bumper blocks 30 preferably bridge spaces between the successive circumferentially alined tongues so that excessive movements in either axial direction are opposed by all of the bumper blocks 30.

It is to be understood that variations and modifications of the specific devices herein shown and described for purposes of illustration, may be made without departing from the spirit of the invention.

What I claim is:

1. A support comprising two members having opposed seating portions and a cushioning unit interposed between said seating portions and supporting one of said members, said unit comprising spaced elastic rubber cushioning and bumper blocks and means flexibly connecting the blocks, said bumper blocks being of less thickness than the cushioning blocks.

2. A support comprising two members having opposed circumferential seating portions and a one piece endless elastic rubber cushioning unit interposed between said seating portions, said unit comprising spaced cushioning and bumper blocks and relatively thin connecting portions, said bumper blocks being of less transverse thickness than the cushioning blocks and being normally supported out of contact with the seating portions of at least one of the supporting members.

3. A support comprising an outer member having an opening and an inner member centrally disposed with respect to said opening, oppositely facing inclined seats carried by said members adjacent the margin of the opening, and a one piece endless elastic cushioning unit interposed between said oppositely facing seats, said unit comprising circumferentially spaced cushioning blocks, intermediate bumper blocks and integral webs of relatively small cross section connecting said blocks, said bumper blocks being of less thickness than the cushioning blocks and being normally supported out of contact with at least one of the seats between which it is interposed.

4. A support comprising an outer member having an opening and circumferentially spaced oppositely inclined seats projecting into said opening, an inner member having circumferentially spaced oppositely inclined seats opposed to the seats of the outer member, and rubber cushioning units comprising circumferentially spaced elastic rubber cushioning blocks, intermediate elastic rubber bumper blocks and means flexibly connecting the blocks, said cushioning and bumper blocks being interposed between the opposed seats of said members with each bumper block out of contact with at least one of the seats between which it is interposed.

5. A support comprising an outer member having an opening and circumferentially spaced oppositely inclined seats projecting into said opening, an inner member having circumferentially spaced oppositely inclined seats opposed to the seats of the outer member, and an elastic rubber cushioning ring comprising cushioning blocks, bumper blocks and relatively thin webs connecting said blocks, said blocks being interposed between said seats and said bumper blocks being of less thickness than the cushioning blocks.

6. A support comprising an inner and outer member each having the same number of circumferentially spaced seats, the alternate seats of each member being in circumferential alinement and offset axially with respect to intermediate circumferentially alined seats, circumferentially alined seats of one member being disposed between and in circumferential alinement with circumferentially alined seats of the other member and each of the seats of one member being opposed to a seat of the other member, and elastic rubber cushioning blocks interposed between opposed seats.

7. A support comprising an outer member having an opening and an even number of circumferentially spaced seats projecting into the opening, successive seats being axially spaced and facing in opposite directions, an inner member having an equal number of similarly arranged outwardly extending seats that face the seats of the outer member in axial alinement therewith, and elastic rubber cushioning blocks interposed between each pair of opposed seats.

8. A support comprising an outer member having an opening and an even number of uniformly spaced seats projecting into the opening, successive seats being axially spaced and facing in opposite directions, alternate seats being circumferentially alined, an inner member having similarly arranged seats adapted to be interposed between and in circumferential alinement with the seats of the outer member and facing the seats of the outer member, and a cushioning unit interposed between said members, said unit comprising circumferentially spaced elastic rubber cushioning blocks, intermediate elastic rubber bumper blocks and flexible means connecting said blocks, said cushioning blocks being interposed between opposed seats, and said bumper blocks being disposed to bridge the spaces between circumferentially alined seats.

LEON F. THIRY.

REFERENCES CITED

The following references are of record in the file of this patent:

UNITED STATES PATENTS

| Number | Name | Date |
|---|---|---|
| 758,457 | Macfarlane | Apr. 26, 1904 |

FOREIGN PATENTS

| Number | Country | Date |
|---|---|---|
| 140,465 | Great Britain | June 20, 1921 |